United States Patent
Battisti et al.

(10) Patent No.: US 9,759,365 B2
(45) Date of Patent: Sep. 12, 2017

(54) HIGH-PRESSURE QUICK-DISCONNECT CONNECTOR WITH AUTOMATIC PRESSURE-BASED LOCKOUT CONTROL

(71) Applicant: Air-Lock, Inc., Milford, CT (US)

(72) Inventors: Brian A. Battisti, Naugatuck, CT (US); John J. McKeon, Hamden, CT (US); Dennis L. Finch, West Haven, CT (US)

(73) Assignee: Air-Lock, Inc., Milford, CT (US)

( * ) Notice: Subject to any disclaimer, the term of this patent is extended or adjusted under 35 U.S.C. 154(b) by 897 days.

(21) Appl. No.: 14/018,071

(22) Filed: Sep. 4, 2013

(65) Prior Publication Data
US 2014/0062080 A1    Mar. 6, 2014

Related U.S. Application Data

(60) Provisional application No. 61/697,129, filed on Sep. 5, 2012.

(51) Int. Cl.
*F16L 37/08*  (2006.01)
*F16L 37/086* (2006.01)

(52) U.S. Cl.
CPC ............ *F16L 37/08* (2013.01); *F16L 37/086* (2013.01); *F16L 2201/20* (2013.01)

(58) Field of Classification Search
USPC .............. 285/316–317, 81–83, 101–102
See application file for complete search history.

(56) References Cited

U.S. PATENT DOCUMENTS 2,099,335 A * 11/1937 Hansen ............... F16L 37/22
                                                              251/149.6
4,483,510 A * 11/1984 Palau ................ F16L 37/0841
                                                              137/596
(Continued)

FOREIGN PATENT DOCUMENTS

AT      397137 B      2/1994
DE   19547312 A1      6/1997
(Continued)

OTHER PUBLICATIONS

International Search Report, PCT/US2013/058019, Nov. 6, 2013, 13 Pgs.

*Primary Examiner* — Aaron Dunwoody
*Assistant Examiner* — Fannie Kee
(74) *Attorney, Agent, or Firm* — Burns & Levinson, LLP; Steven M. Mills

(57) ABSTRACT

According to one aspect, a quick disconnect connector is provided. The quick disconnect connector includes a first component and a second component which is matable with the first component. A releasing element is engageable with at least one of the first component and the second component to unmate the first component and the second component. A locking element is movable between a locked position and an unlocked position. The locking element, in the locked position, engages the releasing element to prevent the releasing element from unmating the first component and the second component. The locking element is movable from the unlocked position to the locked position by application of a locking force to the locking element. The locking force can be applied to the locking element by fluid being carried by the quick-disconnect connector.

6 Claims, 8 Drawing Sheets

(56) References Cited

U.S. PATENT DOCUMENTS

| | | | | |
|---|---|---|---|---|
| 4,541,457 | A | * | 9/1985 | Blenkush ............ F16L 37/0841 137/614.05 |
| 4,613,112 | A | * | 9/1986 | Phlipot .................. F16L 37/22 137/71 |
| 4,863,201 | A | * | 9/1989 | Carstens ................ F16L 37/42 251/149.6 |
| 5,033,777 | A | * | 7/1991 | Blenkush ............ F16L 37/0841 285/317 |
| 5,806,832 | A | * | 9/1998 | Larbuisson ............. F16L 37/42 251/149.6 |
| 5,845,943 | A | * | 12/1998 | Ramacier, Jr. ...... F16L 37/0841 137/614.04 |
| 7,153,296 | B2 | * | 12/2006 | Mitchell ............... A61M 39/10 251/149.9 |
| 2005/0012330 | A1 | * | 1/2005 | Schmidt ................. F16L 37/42 285/317 |
| 2005/0197000 | A1 | | 9/2005 | Tiberghien et al. |
| 2007/0213691 | A1 | | 9/2007 | Summerer et al. |
| 2007/0246108 | A1 | | 10/2007 | Conway |
| 2008/0196721 | A1 | * | 8/2008 | Mele ....................... A62B 9/02 128/204.21 |
| 2009/0085348 | A1 | | 4/2009 | Tiberghien et al. |
| 2013/0252454 | A1 | | 9/2013 | Zahler et al. |

FOREIGN PATENT DOCUMENTS

| | | |
|---|---|---|
| EP | 1557599 A1 | 7/2005 |
| EP | 1832220 A2 | 9/2007 |

* cited by examiner

HIGH-PRESSURE QUICK-DISCONNECT CONNECTOR WITH AUTOMATIC PRESSURE-BASED LOCKOUT CONTROL

RELATED APPLICATIONS

The present application is related to and claims the benefit of priority to U.S. provisional patent application No. 61/697,129, filed Sep. 5, 2012, the entire contents of which are incorporated herein by reference.

BACKGROUND

1. Technical Field

This disclosure is related to quick-disconnect connectors and, more particularly, quick-disconnect connectors operable at high pressure.

2. Discussion of the Related Art

Flexible and non-flexible hoses, lines, pipes, tubes, etc. are commonly used to carry fluids such as liquids or gases. The fluids can be under reduced pressure, elevated pressure or at the pressure of the ambient environment. It is often desirable to connect multiple hoses, lines, pipes, tubes, etc. This is commonly done using quick-disconnect connectors. Quick-disconnect connectors commonly include a first component, e.g., a male component, which mates with a second, e.g., female, component. Each of the first and second components of the quick-disconnect connector is connected to an end of one of the hoses, lines, pipes, tubes, etc., that are to be connected. That is, the first component of the quick-disconnect connector can be connected to an end of a first hose, line, pipe, tube, etc., and the second component of the quick-disconnect connector can be connected to an end of a second hose, line, pipe, tube, etc. When the first and second components of the quick-disconnect connector are mated, then the first and second hoses, lines, pipes, tubes, etc. are connected, such that the fluid being carried by the hoses, lines, pipes, tubes, etc. can flow from/to the first hose, line, pipe, tube, etc., through the quick-disconnect connector, and then to/from the second hose, line, pipe, tube, etc.

Quick-disconnect connectors can be readily, i.e., quickly, mated and unmated to connect and disconnect the hoses, lines, pipes, tubes, etc. The mating and unmating is typically carried out by releasing a mechanical holding mechanism which holds the components of the quick-disconnect connector in the mated configuration, and then sliding the first and second components together or apart. When the first and second components are mated, the holding mechanism holds the two components together in the mated configuration. To unmate the two components of the quick-disconnect connector, the holding mechanism is released by applying mechanical actuation force against one or more spring-loaded release actuation devices. To activate the holding mechanism and, therefore, hold the quick-disconnect connector in the mated configuration, the mechanical actuation force applied against the spring-loaded release actuation devices is released.

It is very important that the quick-disconnect connector remain in the mated configuration when mating of the quick-disconnect connector and, therefore, connection of the first and second hoses, lines, pipes, tubes, etc. is desired. Inadvertent unmating of the quick-disconnect connector can have very serious and dangerous effects, particularly when the fluid being transferred through the quick-disconnect connector is at elevated pressure. One means by which the quick-disconnect connector could be inadvertently unmated is the inadvertent, accidental application of a mechanical actuation force against the spring-loaded release actuation devices. Any number of factors can apply this force and, as a result, unmate the quick-disconnect connector inadvertently. These include operator error, shock and vibration, and other possible factors.

SUMMARY

According to one aspect, a quick disconnect connector is provided. The quick disconnect connector includes a first component and a second component which is matable with the first component. A releasing element is engageable with at least one of the first component and the second component to unmate the first component and the second component. A locking element is movable between a locked position and an unlocked position. The locking element, in the locked position, engages the releasing element to prevent the releasing element from unmating the first component and the second component. The locking element is movable from the unlocked position to the locked position by application of a locking force to the locking element.

According to another aspect, a quick disconnect connector is provided. A first component includes a first holding element, and a second component includes a second holding element. The first and second components are matable. The first holding element is engageable with the second holding element to hold the first component and the second component in a mated configuration when at least one of the first holding element and the second holding element is in a holding configuration of the at least one of the first holding element and the second holding element and the first component and second components are in the mated configuration. One of the first component and the second component comprises a releasing element mechanically coupled to the at least one of the first holding element and the second holding element, the releasing element engaging the at least one of the first holding element and the second holding element to transition the at least one of the first holding element and the second holding element from the holding configuration of the at least one of the first holding element and the second holding element to a released configuration of the at least one of the first holding element and the second holding element. A locking element is movable between a locked position and an unlocked position. The locking element, in the locked position, engages the at least one of the first holding element and the second holding element to prevent the at least one of the first holding element and the second holding element from transitioning from the released configuration of the at least one of the first holding element and the second holding element to the holding configuration of the at least one of the first holding element and the second holding element. The locking element, in the unlocked position, allows the at least one of the first holding element and the second holding element to transition from the holding configuration of the at least one of the first holding element and the second holding element to the released configuration of the at least one of the first holding element and the second holding element. The locking element is movable from the unlocked position to the locked position by application of a locking force to the locking element.

BRIEF DESCRIPTION OF THE DRAWINGS

The foregoing and other features and advantages will be apparent from the more particular description of preferred embodiments, as illustrated in the accompanying drawings, in which like reference characters refer to the same parts throughout the different views. The drawings are not necessarily to scale, emphasis instead being placed upon illustrating the principles of the preferred embodiments. In the drawings, the sizes and thicknesses of layers, regions and features may be exaggerated for clarity.

DETAILED DESCRIPTION

Figure 1:
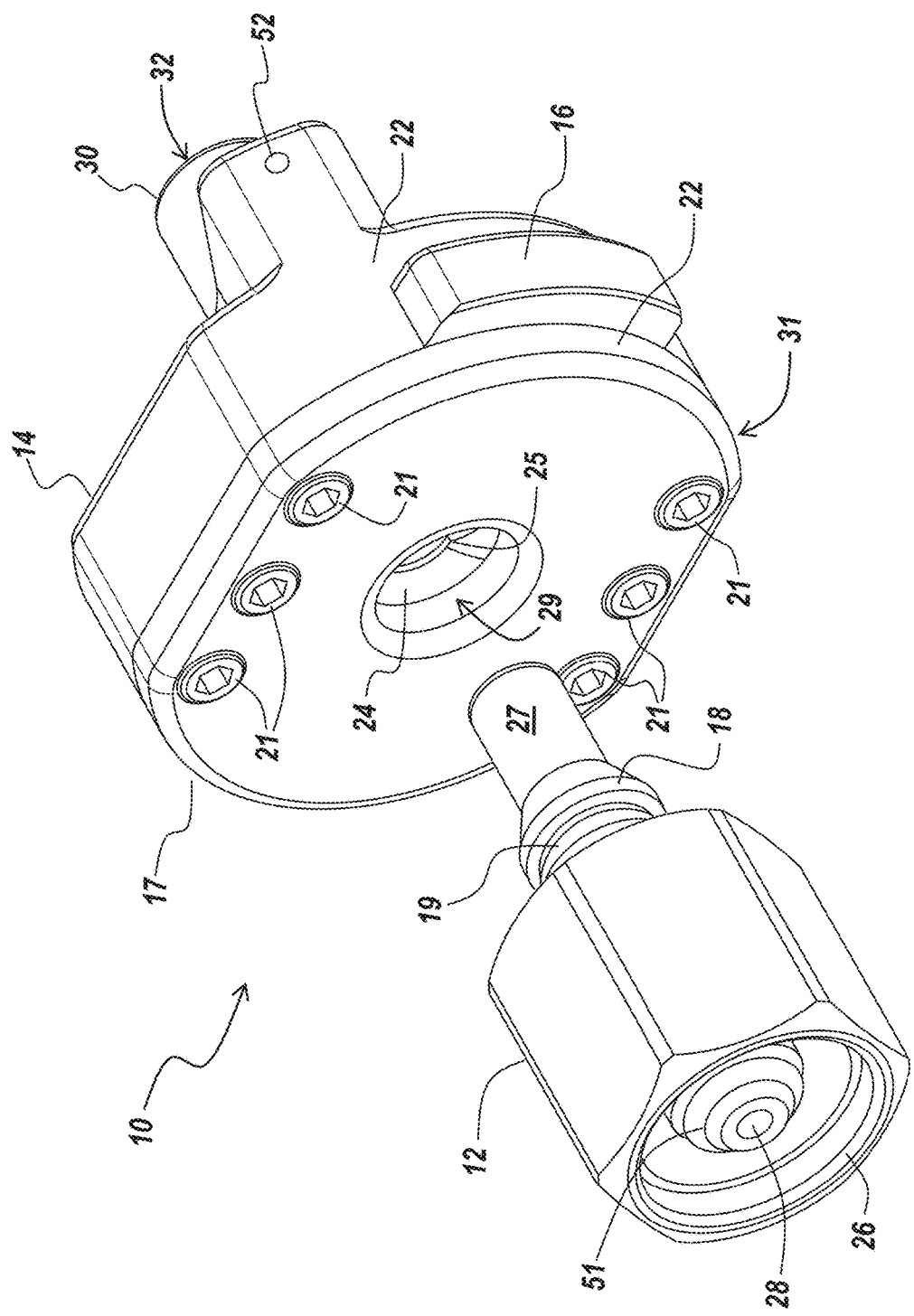
FIG. 1 includes a schematic perspective view of a quick-disconnect connector, in an unmated configuration, according to some exemplary embodiments.
Figure 2:
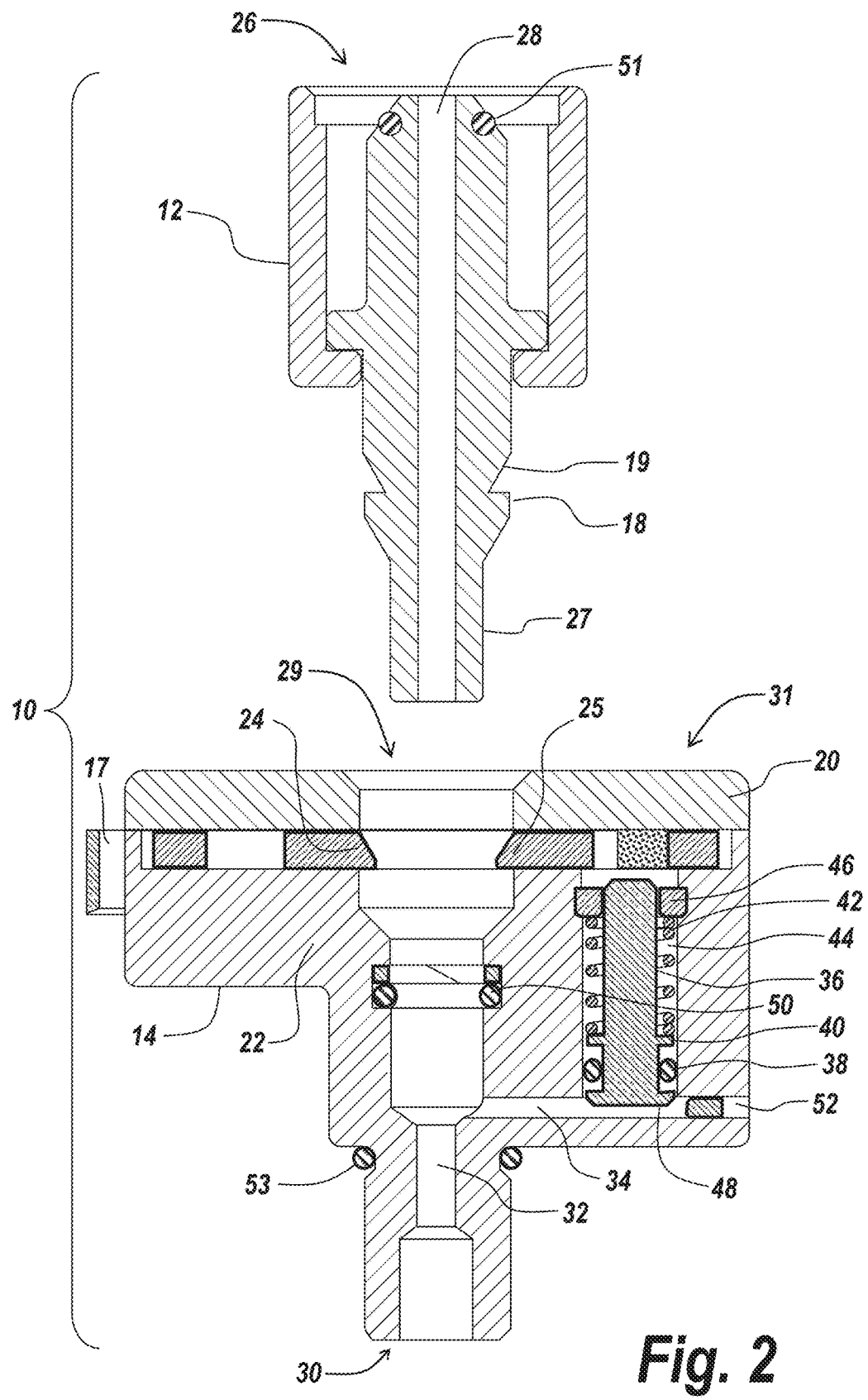
FIG. 2 includes a schematic cross-sectional view of the quick-disconnect connector of FIG. 1, in the unmated configuration, according to some exemplary embodiments.
Figure 3:
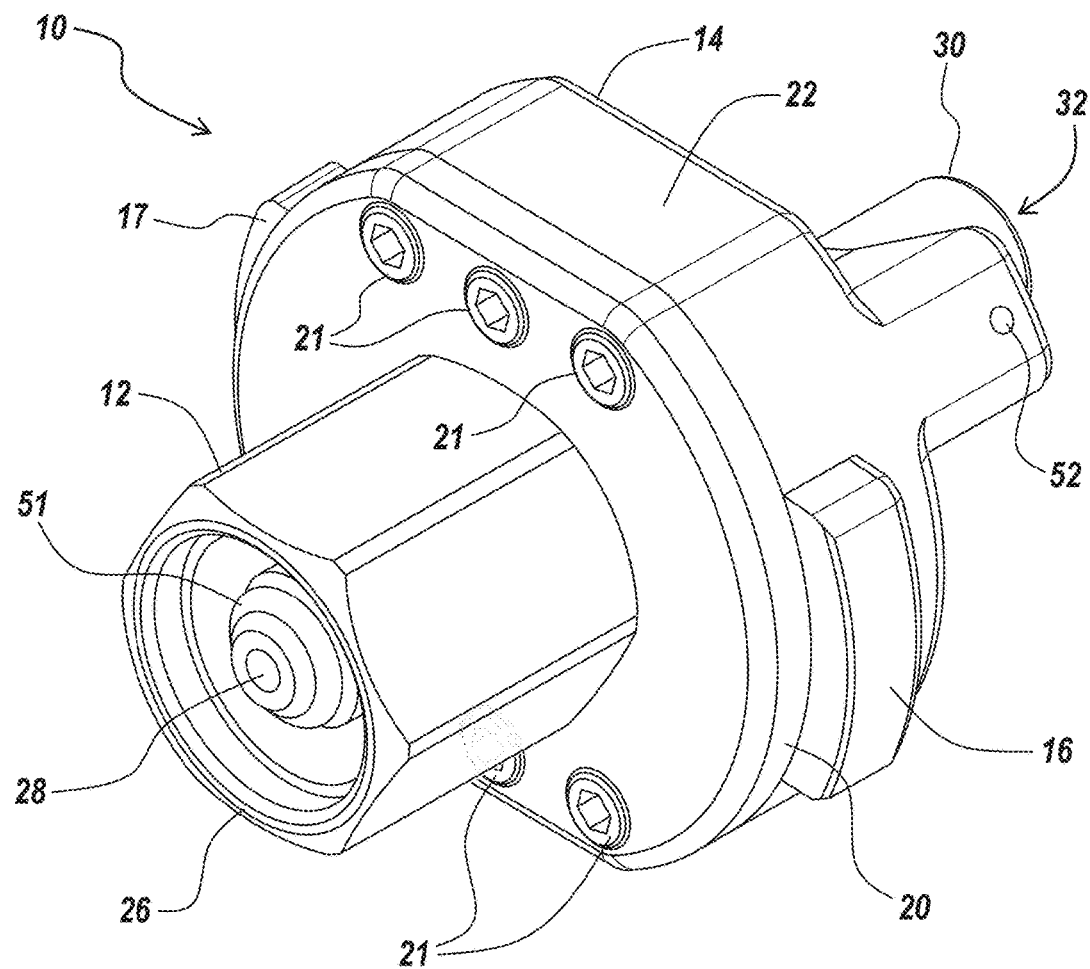
FIG. 3 includes a schematic perspective view of the quick-disconnect connector of FIGS. 1 and 2, in a mated configuration, according to some exemplary embodiments.
Figure 4:
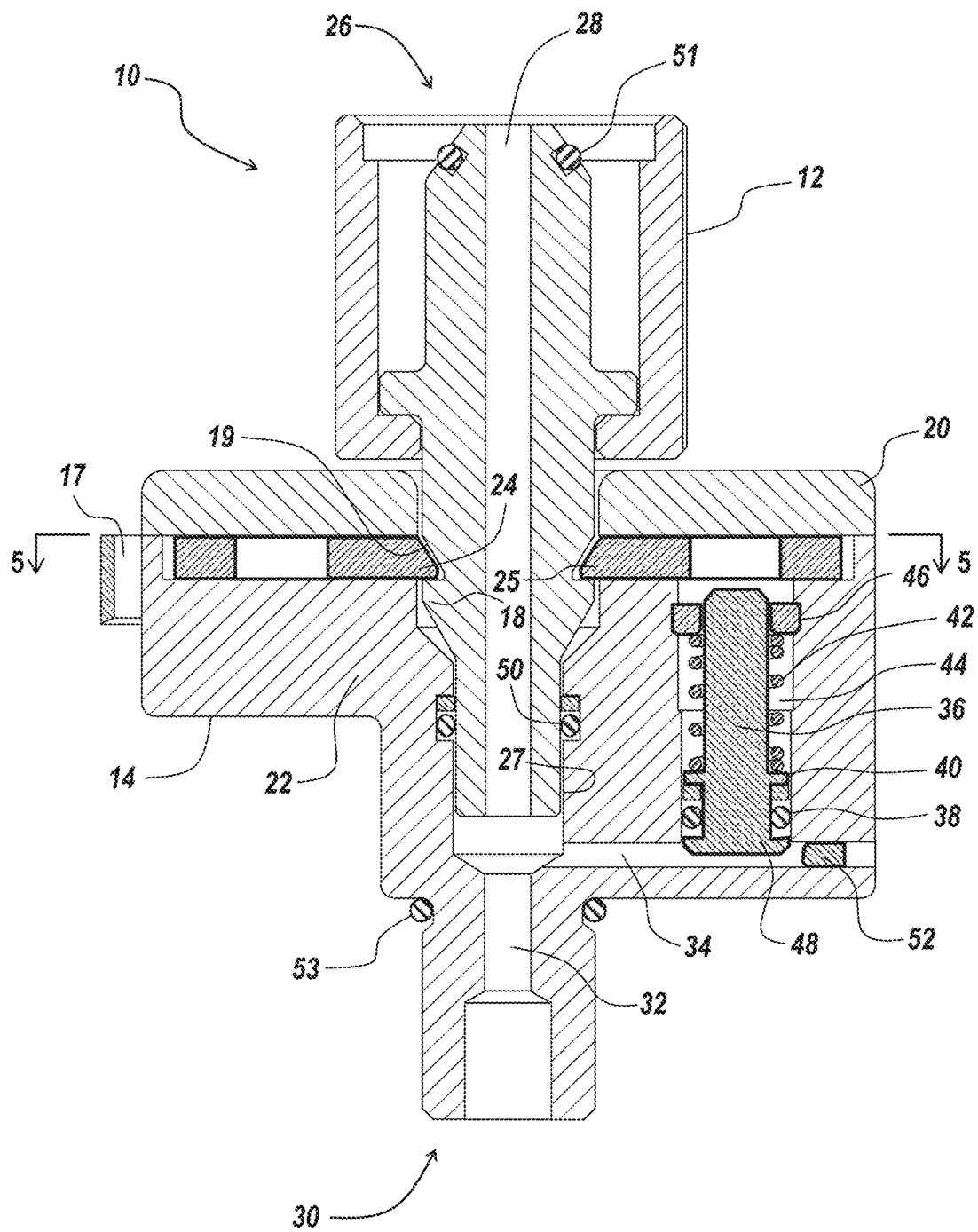
FIG. 4 includes a schematic cross-sectional view of the quick-disconnect connector of FIGS. 1-3, in the mated configuration, according to some exemplary embodiments.

FIG. 1 includes a schematic perspective view of a quick-disconnect connector 10, in an unmated configuration, according to some exemplary embodiments. FIG. 2 includes a schematic cross-sectional view of the quick-disconnect connector 10 of FIG. 1, in the unmated configuration, according to some exemplary embodiments. FIG. 3 includes a schematic perspective view of the quick-disconnect connector 10 of FIGS. 1 and 2, in a mated configuration, according to some exemplary embodiments. FIG. 4 includes a schematic cross-sectional view of the quick-disconnect connector 10 of FIGS. 1-3, in the mated configuration, according to some exemplary embodiments.

Referring to FIGS. 1-4, according to some exemplary embodiments, the quick-disconnect connector 10 includes a first male component 12, which is matable with a second female component 14. First component 12 includes a first end 26, which can be connected to a first hose, line, pipe, tube, etc. (not shown) via threaded attachment or other means of attachment, and a second end 27, which can be inserted into opening 29 of second component 14 to mate the first and second components 12 and 14. First component 12 can be sealed at its first end 26 at the first hose, line, pipe, tube, etc., by O-ring 51. Second component 14 includes a first end 30, which can be connected to a second hose, line, pipe, tube, etc. (not shown) via threaded attachment or other means of attachment, and a second end 31, having opening 29, into which can be inserted second end 27 of first male component 12 to mate the first and second components 12 and 14. Second component 14 can be sealed at its first end 30 at the second hose, line, pipe, tube, etc. by O-ring 53.

First component 12 includes an interior longitudinal passage 28 for carrying a fluid such as a gas or liquid through the first component 12. The second component 14 includes an interior longitudinal passage 32 for carrying the fluid through second component 14. When the first and second components are in the mated configuration as illustrated in FIGS. 3 and 4, interior longitudinal passage 28 of first component 12 and interior passage longitudinal 32 of second component 14 are connected such that the fluid can flow from the first hose, line, pipe, tube, etc. (not shown) through first component 12, through second component 14, and through second hose, line, pipe, tube, etc. (not shown), or the fluid can flow in the opposite direction. When first and second components 12 and 14 are in the mated configuration as illustrated in FIGS. 3 and 4, first component 12 and second component 14 can be sealed by O-ring 50.

Second component 14 includes a housing 22. A cover 20 is attached to housing 22 by a plurality of fasteners such as, for example, hex-cap screws 21.

First component 12 includes an annular groove 19 and protrusion 18 formed, in some exemplary embodiments, on or near at least a portion of the exterior of second end 27 of first component 12. First component 12 and second component 14 are held together in the mated configuration by mechanical engagement between annular groove 19 and protrusion 18 and one or more releasable holding protrusions 24, 25 in second component 14.

Figure 5:
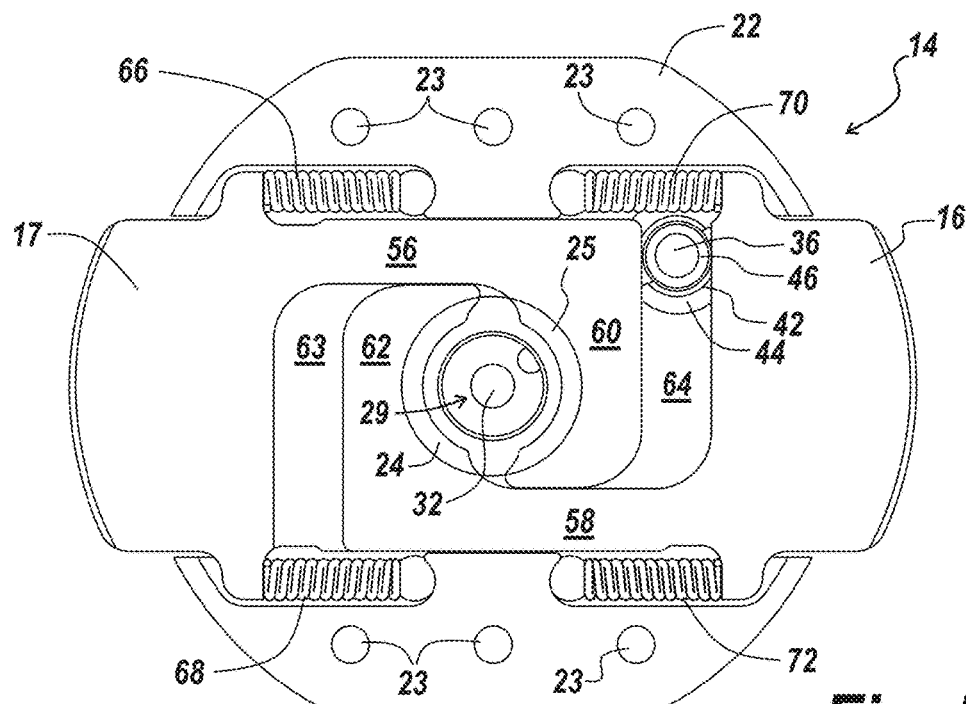
FIG. 5 includes a schematic perspective view of the second component of the quick-disconnect connector, with a cover removed from a housing, according to some exemplary embodiments.
Figure 6:
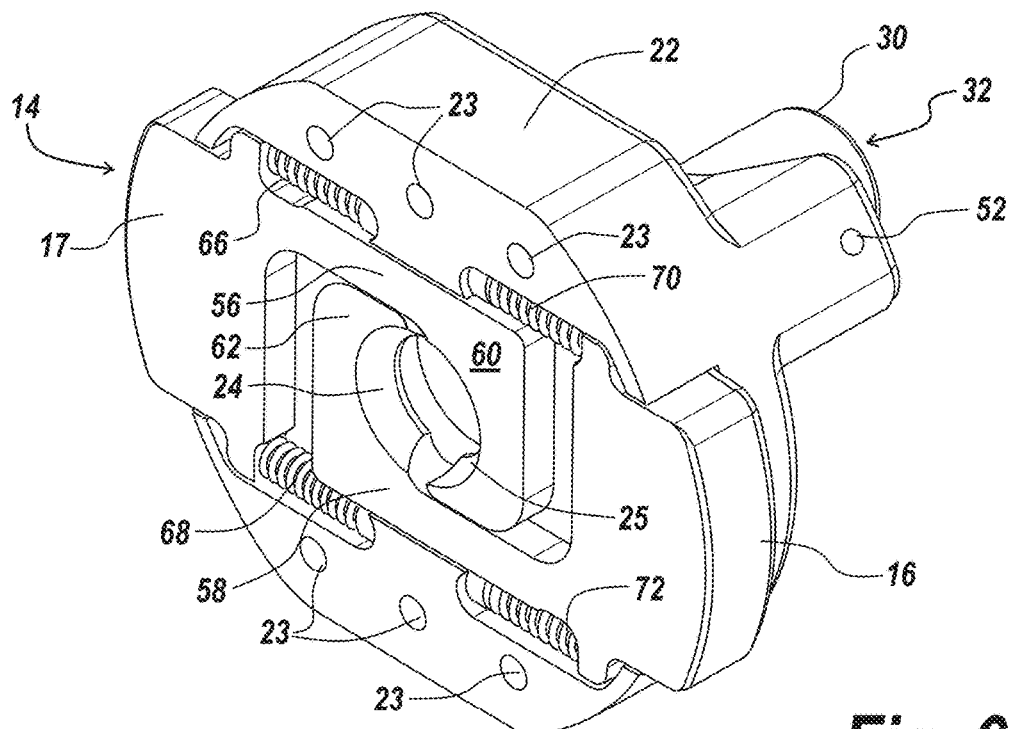
FIG. 6 includes a schematic perspective view of the second component of the quick-disconnect connector, with the cover removed from the housing, according to some exemplary embodiments.

Releasable engagement of protrusions 24, 25 of second component 14 with protrusion 18 and groove 19 of first component 12 is controlled via spring-loaded release buttons 16 and 17. FIG. 5 includes a schematic cross-sectional view of second component 14 of quick-disconnect connector 10, with cover 20 removed from housing 22, according to some exemplary embodiments. FIG. 6 includes a schematic perspective view of second component 14 of quick-disconnect connector 10, with cover 20 removed from housing 22, according to some exemplary embodiments. In FIGS. 5 and 6, cover 20, which as noted above can be held to housing 22 by screws 21 into, for example, threaded holes 23 in housing 22, is removed to clarify illustration of some internal elements of second component 14.

Referring to FIGS. 1-6, release buttons 16 and 17 are spring-loaded or spring-biased away from each other, i.e., away from internal longitudinal passage 32, by springs 66, 68, 70 and 72. Release button 16 includes an arm portion 58 connected to a distal portion 62, which is formed to include protrusion 24. Similarly, release button 17 includes an arm portion 56 connected to a distal portion 60, which is formed to include protrusion 25. With the mechanical bias provided by springs 66, 68, 70 and 72, when no force is applied to release buttons 16, 17 against the spring bias force, protrusions 24 and 25 are biased toward each other into opening 29 in second component 14. In this position, if first and second components 12 and 14 are in the mated configuration, protrusions 24 and 25 engage groove 19 and protrusion 18 to hold first and second components 12 and 14 together in the mated configuration.

When a releasing force is applied to release buttons 16, 17 against the spring bias force, release buttons 16, 17 move toward each other such that protrusions 24, 25 move away from each other toward a release position. In this position, each of release buttons 16, 17 is moved radially toward the internal longitudinal passage of second component 14 across a respective open space 64, 63 positioned between one of the release buttons 16, 17 and distal portion 60, 62, respectively, of the other release button 17, 16. With protrusions 24, 25 in this release position, they would no longer engage groove 19 and protrusion 18 in first component 12, and, as a result, first and second components 12 and 14 could be separated and removed from the mated configuration.

According to exemplary embodiments, quick-disconnect connector 10 includes an automatic locking feature, which prevents quick-disconnect connector 10 from being inadvertently removed from the mated configuration. When first and second components 12 and 14 are in the mated configuration, the automatic locking feature of the quick-disconnect connector 10 prevents first and second components 12 and 14 from unmating from each other.

Figure 7:
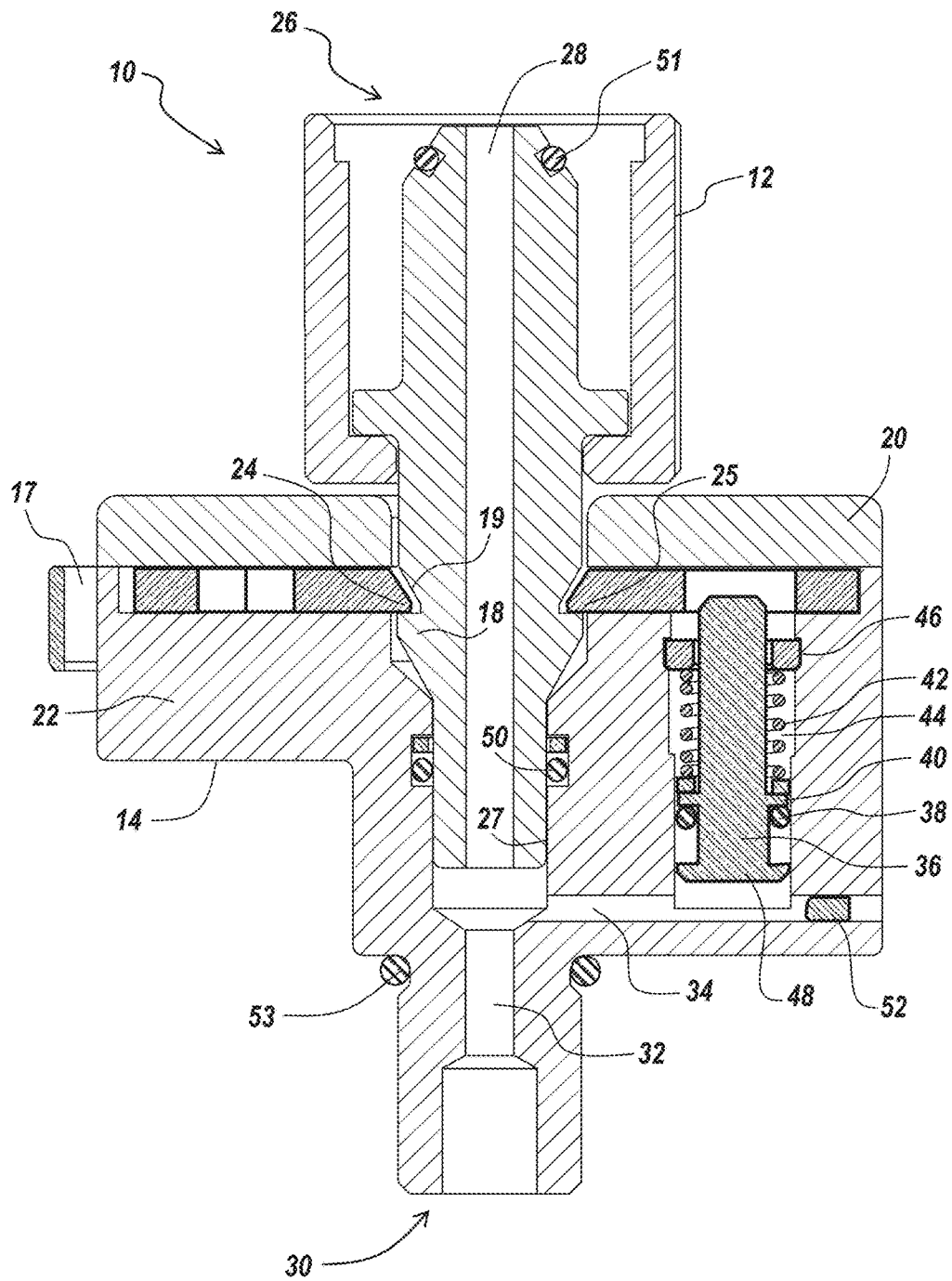
FIG. 7 includes a schematic cross-sectional diagram which illustrates the quick-disconnect connector in a mated configuration and a locked configuration, according to some exemplary embodiments.
Figure 8:
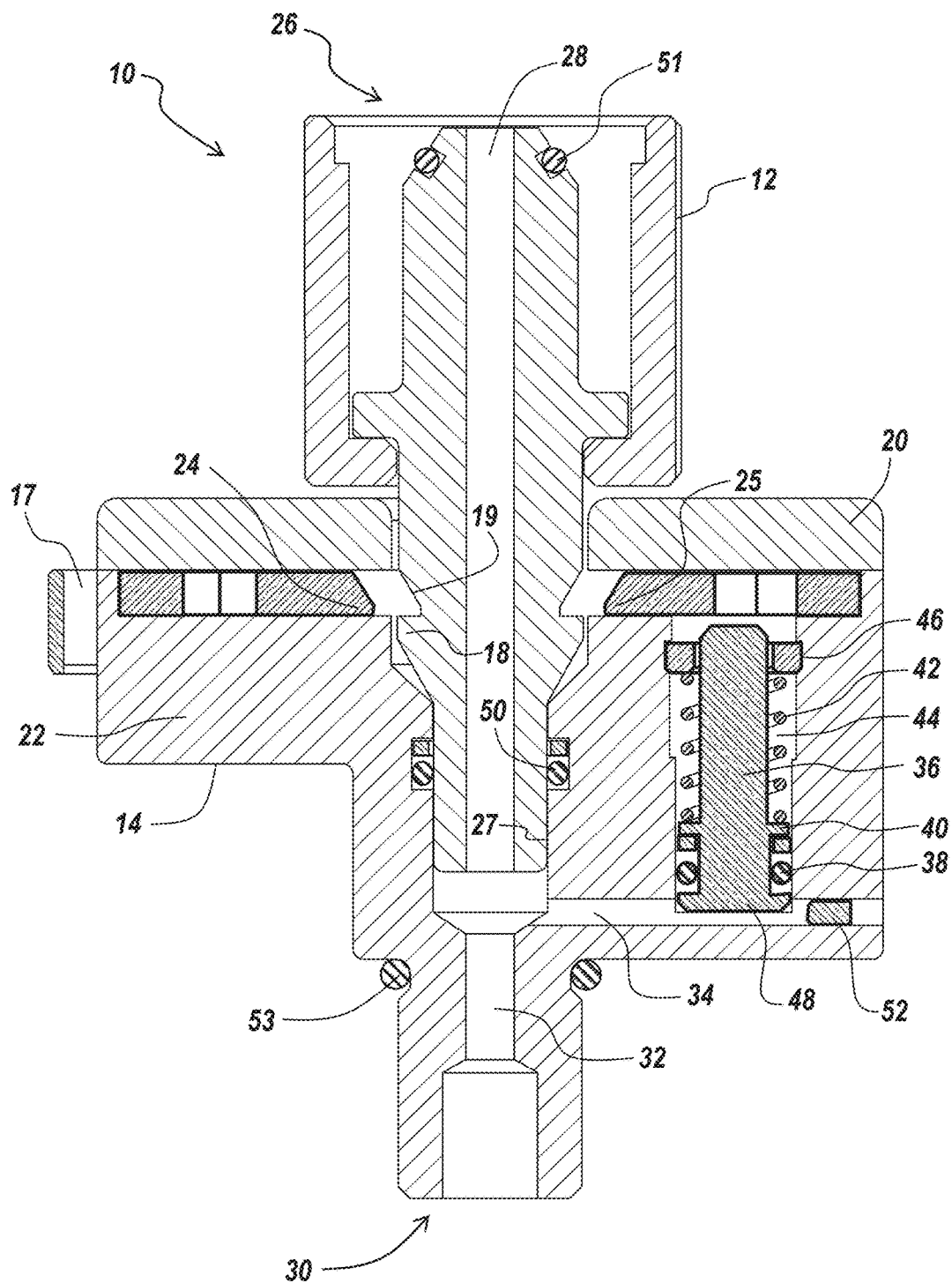
FIG. 8 includes a schematic cross-sectional diagram which illustrates the quick-disconnect connector in a mated configuration and an unlocked configuration, according to some exemplary embodiments.

According to some exemplary embodiments, the automatic locking mechanism of the quick-disconnect connector 10 includes a movable piston which is movable between a locked position and an unlocked position. FIG. 7 includes a schematic cross-sectional diagram which illustrates the quick-disconnect connector 10 in a mated configuration and a locked configuration, according to some exemplary embodiments. FIG. 8 includes a schematic cross-sectional diagram which illustrates the quick-disconnect connector 10 in a mated configuration and an unlocked configuration, according to some exemplary embodiments.

Referring to FIGS. 1-8, according to some exemplary embodiments, the locking mechanism of the quick-disconnect connector 10 includes a movable piston 36, which is disposed within a space 44 and which can translate longitudinally within space 44 between the locked position illustrated in FIG. 7 and the unlocked position illustrated in FIG. 8. As illustrated most clearly in FIGS. 5 and 7, when piston 36 is in the locked position, piston 36 is translated into space 64 between release button 16 and distal portion 60 of release button 17. In this position, piston 36 interferes with movement of release buttons 16 and 17, thus preventing force applied to release buttons 16 and 17 from moving protrusions 24 and 25 of second component away from each other and releasing protrusions 24 and 25 from groove 19 and protrusion 18 of first component 12. As a result, release buttons 16 and 17 cannot be depressed to unmate first component 12 and second component 14 of quick-disconnect connector 10. That is, with piston 36 in the locked position illustrated in FIG. 7, quick-disconnect connector 10 is locked in the mated configuration.

As illustrated in FIGS. 6 and 8, when piston 36 is in the unlocked position, piston 36 is translated out of space 64 between release button 16 and distal portion 60 of release button 17. In this position, piston 36 does not interfere with movement of release buttons 16 and 17, and, therefore, does not prevent force applied to release buttons 16 and 17 from moving protrusions 24 and 25 of second component away from each other and releasing protrusions 24 and 25 from groove 19 and protrusion 18 of first component 12. As a result, release buttons 16 and 17 can be depressed to unmate first component 12 and second component 14 of quick-disconnect connector 10. That is, with piston 36 in the unlocked position illustrated in FIG. 8, quick-disconnect connector 10 is unlocked and can be released from the mated configuration.

As noted above, piston 36 is disposed within longitudinal space 44. Piston 36 is spring biased toward the unlocked position illustrated in FIG. 8 by a coil spring 42, which is captured between a flange 40 on piston 36 and a spring retainer 46 formed to be stationary with respect to housing 22 of second component 14. Piston 36 is sealed to the wall of space 44 by an O-ring 38 captured between flange 40 and backend flange portion 48 of piston 36.

As described above, piston 36 is biased by coil spring 42 into the unlocked position illustrated in FIG. 8. Piston 36 can be translated longitudinally within space 44 to the locked position illustrated in FIG. 7 by a force exerted on the backend flange portion 48 of piston 36. If the force applied to backend flange portion 48 overcomes the bias force exerted on piston 36 by coil spring 42, then piston 36 translates into the locked position to lock quick-disconnect connector 10 in the mated configuration.

According to some exemplary embodiments, the force exerted on backend flange portion 48 of piston 36 is provided by the fluid being carried through quick-disconnect connector 10. As described above, when quick-disconnect connector 10 is in the mated configuration, interior longitudinal passage 28 of first component 12 is connected to interior longitudinal passage 32 of second component 14 such that the fluid, e.g., gas or liquid, can pass through quick-disconnect connector 10. According to some exemplary embodiments, the combined interior longitudinal passage 28/32 is open to and connected to another interior passage 34 within second component 14. Interior passage 34 is open to backend flange portion 48 of piston 36 and, therefore, the fluid within passages 28, 32 and 34 impinges on backend flange portion 48 of piston 36. Passage 34 and, therefore, passages 28 and 32, are isolated from the ambient exterior environment by sealing plug 52, which can be threaded or pressed into a hole in housing 22 of second component 14. If the pressure of the fluid is sufficiently high, then the fluid can exert force on backend flange portion 48 of piston 36 to translate piston 36 against the bias provided by coil spring 42 into the locked position.

In operation, when first and second components 12 and 14 of quick-disconnect connector 10 are mated, and the pressure of the fluid in interior passages 28, 32 and 34 is insufficient to exert sufficient pressure on backend flange portion 48 of piston 36 to displace piston 36 against the bias exerted by coil spring 42, quick-disconnect connector 10 remains unlocked. As such, release buttons 16 and 17 can be depressed to unmate first and second components 12 and 14 of quick-disconnect connector 10. If the pressure of the fluid increases sufficiently such that sufficient force is applied to backend flange portion 48 of piston 36 to displace piston 36 against the bias exerted by coil spring 42, quick-disconnect connector 10 becomes locked, such that release buttons 16 and 17 can no longer be depressed to unmate quick-disconnect connector 10. Therefore, at a high fluid pressure, the quick-disconnect connector 10 is locked such that undesirable and/or inadvertent unmating of quick-disconnect connector 10 is prevented. If the fluid pressure then drops sufficiently, the force exerted by coil spring 42 can displace piston 36 to the unlocked position such that the release buttons 16 and 17 can be depressed to unmate quick-disconnect connector 10.

Figure 9:
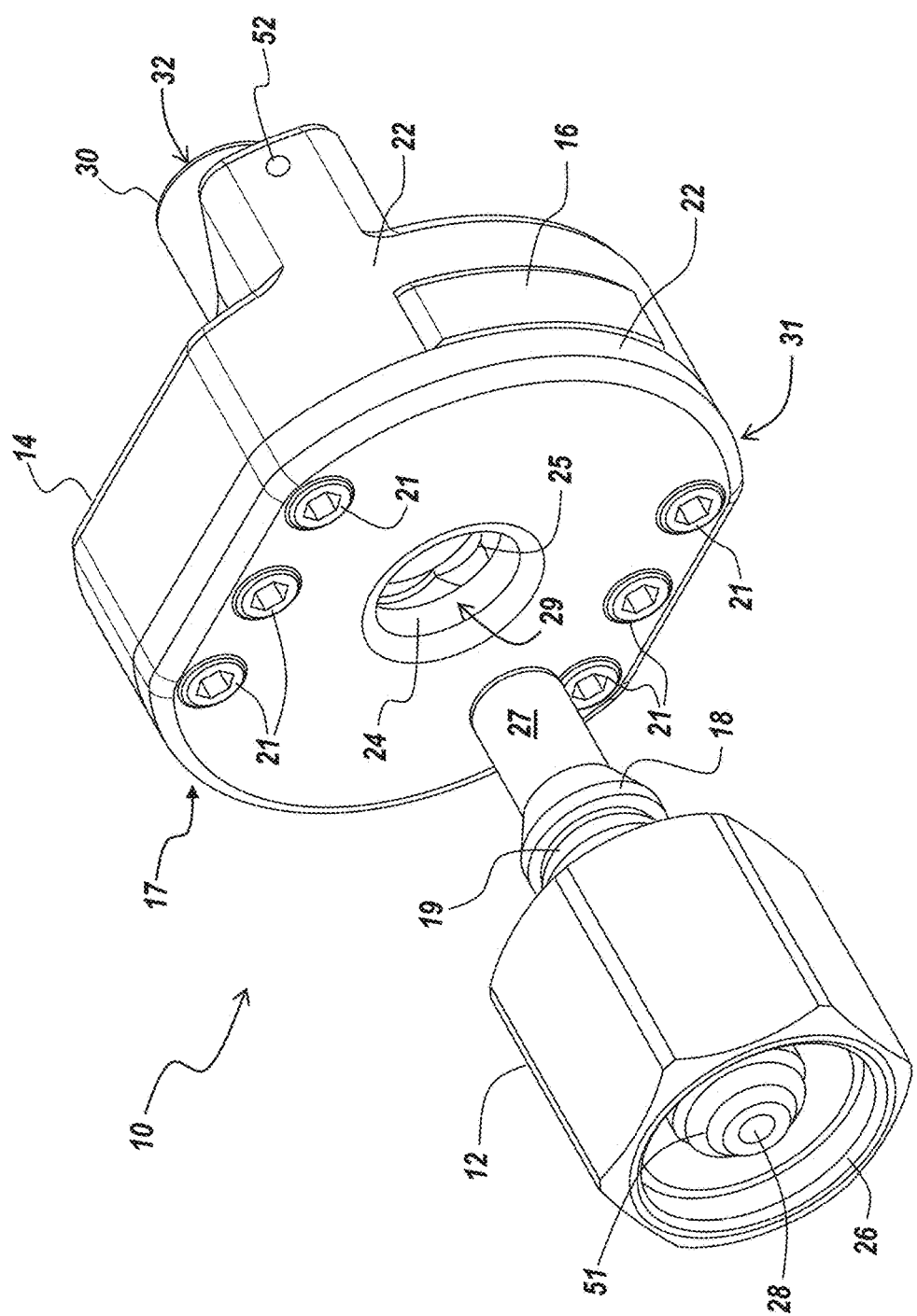
FIG. 9 includes a schematic perspective view of a quick-disconnect connector, in an unmated configuration, with release buttons depressed, according to some exemplary embodiments.

FIG. 9 includes a schematic perspective view of a quick-disconnect connector 10, in an unmated configuration, with release buttons depressed, according to some exemplary embodiments. FIG. 9 is identical to FIG. 1, and the description herein in connection with FIG. 1 applies as well to FIG. 9. In FIG. 9, release buttons 16 and 17 have been depressed such that protrusions 24 and 25 are released such that end 27 of first component 12 can be easily inserted into opening 29 of second component 14 for mating. It should be noted that it is not necessary to depress release buttons 16 and 17 to mate components 12 and 14. They may simply be forced together with a force sufficient to cause engagement of protrusion with 18 with protrusions 24 and 25 to displace protrusions 24 and 25 against the spring bias of protrusions 24 and 25. As insertion continues, the spring bias of protrusions 24 and 25 will cause them to snap into engagement with groove 19 and protrusion 18 to mate first and second components 12 and 14.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

We claim:

1. A quick disconnect connector through which a fluid can flow, comprising:
    a first component defining a first internal longitudinal passage defining a first flow axis along which the fluid can flow through the first component;
    a second component being matable together with the first component and defining a second internal longitudinal passage defining a second flow axis along which the fluid can flow through the second component, the first and second flow axes being substantially the same and the first and second internal longitudinal passages being substantially aligned when the first and second components are mated together, such that the fluid can flow through the quick disconnect connector along the first and second internal longitudinal passages when the first and second components are mated together;
    at least two release buttons in one of the first and second components, the release buttons being movable in a direction transverse to the first and second flow axes between first and second transverse positions, each of the release buttons having a protrusion that is engageable with a groove portion of the other of the first and second components, in the first transverse position of the release buttons, the protrusions of the release buttons engaging the groove portion to hold the first and second components mated together, and, in the second transverse position of the release buttons, the protrusions of the release buttons being disengaged from the groove portion to release the first and second components such that the first and second components are unmated, the release buttons being spring-biased toward the first transverse position; and
    a locking element in the one of the first and second components, the locking element being movable along a locking axis substantially parallel to the first and second flow axes between a locked position and an unlocked position, the locking element, in the locked position, engaging at least one of the release buttons to prevent the release buttons from moving toward the second transverse position, such that the protrusions of the release buttons remain in engagement with the groove portion of the other of the first and second components, such that the first and second components remain mated, and, the locking element, in the unlocked position, being out of engagement with the at least one of the release buttons to allow the release buttons to move toward the second transverse position, such that the protrusions of the release buttons can come out of engagement with the groove portion of the other of the first and second components, such that the first and second components can be unmated, wherein the locking element is spring-biased toward the unlocked position, and the one of the first and second components is configured such that pressure in the internal longitudinal passage can move the locking element into the locked position against the spring bias;
    wherein each release button comprises a body portion, an arm portion, and a distal portion which comprises the protrusion, the arm portion connecting the body portion to the distal portion such that the body portion and the distal portion are disposed on opposite sides of the internal longitudinal passage of the one of the first and second components.

2. The quick disconnect connector of claim 1, wherein the one of the first and second components is configured such that the pressure in the internal longitudinal passage can be provided by the fluid.

3. The quick disconnect connector of claim 1, wherein, when the body portions of the release buttons are moved toward each other toward the second transverse position, the protrusions of the release buttons move away from each other out of engagement with the groove portion of the other of the first and second components.

4. The quick disconnect connector of claim 1, wherein, when the body portions of the release buttons are moved away from each other toward the first transverse position, the protrusions of the release buttons move toward from each other into engagement with the groove portion of the other of the first and second components.

5. The quick disconnect connector of claim 1, wherein the protrusions in the arm portions of the release buttons are spring-biased toward each other.

6. The quick disconnect connector of claim 1, wherein, in the locked position, the locking element is disposed between the distal portion of one of the release buttons and the body portion of another of the release buttons.

* * * * *